US008506731B2

(12) United States Patent
Meurer et al.

(10) Patent No.: US 8,506,731 B2
(45) Date of Patent: Aug. 13, 2013

(54) METHOD FOR COATING A HOT-ROLLED OR COLD-ROLLED STEEL FLAT PRODUCT CONTAINING 6-30 WT% MN

(75) Inventors: Manfred Meurer, Rheinberg (DE); Ronny Leuschner, Dresden (DE); Michael Steinhorst, Essen (DE)

(73) Assignee: ThyssenKrupp Steel Europe AG, Duisburg (DE)

( * ) Notice: Subject to any disclaimer, the term of this patent is extended or adjusted under 35 U.S.C. 154(b) by 527 days.

(21) Appl. No.: 12/864,102

(22) PCT Filed: Jan. 21, 2009

(86) PCT No.: PCT/EP2009/050657
§ 371 (c)(1),
(2), (4) Date: Oct. 13, 2010

(87) PCT Pub. No.: WO2009/092733
PCT Pub. Date: Jul. 30, 2009

(65) Prior Publication Data
US 2011/0017361 A1  Jan. 27, 2011

(30) Foreign Application Priority Data
Jan. 22, 2008 (DE) .......................... 10 2008 005 605

(51) Int. Cl.
*C21D 8/02* (2006.01)
*B05D 3/00* (2006.01)
*C23C 2/12* (2006.01)
*C23C 2/28* (2006.01)

(52) U.S. Cl.
USPC ............ 148/531; 148/530; 148/533; 427/329

(58) Field of Classification Search
USPC .......................... 148/530, 531, 533; 427/329
See application file for complete search history.

(56) References Cited

U.S. PATENT DOCUMENTS

| 2,564,549 | A | * | 8/1951 | Stargardter ........................ 134/3 |
|---|---|---|---|---|
| 3,660,253 | A | * | 5/1972 | Rauch et al. ................... 205/140 |
| 4,132,568 | A | * | 1/1979 | Irwin ................................ 134/3 |
| 5,677,005 | A |   | 10/1997 | Isobe et al. |
| 5,810,950 | A | * | 9/1998 | Kim et al. ...................... 148/620 |
| 6,387,192 | B1 |   | 5/2002 | Frommeyer et al. |
| 7,794,552 | B2 | * | 9/2010 | Cugy et al. .................... 148/337 |
| 8,128,754 | B2 | * | 3/2012 | Madi et al. ......................... 134/3 |
| 8,394,213 | B2 | * | 3/2013 | Meurer et al. ................. 148/530 |
| 2002/0179113 | A1 | * | 12/2002 | Madi et al. ......................... 134/3 |
| 2006/0179638 | A1 |   | 8/2006 | Engl et al. |
| 2008/0053580 | A1 |   | 3/2008 | Drillet et al. |
| 2008/0271823 | A1 |   | 11/2008 | Hofmann et al. |

FOREIGN PATENT DOCUMENTS

| DE | 19727759 C2 | 5/2000 |
|---|---|---|
| DE | 19900199 A1 | 7/2000 |
| DE | 19943238 A1 | 2/2001 |
| DE | 10259230 A1 | 7/2004 |
| DE | 102005008410 B3 | 2/2006 |
| JP | 361352 A | 3/1991 |
| JP | 3243751 A | 10/1991 |
| JP | 6136578 A | 5/1994 |
| JP | 7216524 A | 8/1995 |
| WO | 2006042931 A1 | 4/2006 |
| WO | 2006089832 A1 | 8/2006 |

* cited by examiner

*Primary Examiner* — Keith Walker
*Assistant Examiner* — Alexander Polyansky
(74) *Attorney, Agent, or Firm* — The Webb Law Firm

(57) ABSTRACT

A method for coating a hot-rolled or cold-rolled steel flat product, containing 6-30% wt. Mn, with a metallic protective layer by hot-clip coating in a melt bath. The coating, achieved with increased production reliability, is optimised by the steel flat product being subjected to a pickling treatment in which the manganese oxide adhering to the steel flat product is essentially fully removed in the pickling bath before the steel flat product enters the melt bath.

19 Claims, 1 Drawing Sheet

METHOD FOR COATING A HOT-ROLLED OR COLD-ROLLED STEEL FLAT PRODUCT CONTAINING 6-30 WT% MN

BACKGROUND OF THE INVENTION

1. Field of the Invention

The invention relates to a method for coating a hot-rolled or cold-rolled steel flat product, containing 6-30% wt. Mn, with a metallic protective layer by hot-dip coating. When "steel flat products" are mentioned here, what are meant are steel strips and steel sheets or comparable rolled products.

2. Description of the Related Art

Steels with high manganese contents are basically notably suitable for use in the area of vehicle construction, in particular in car manufacture, because of their advantageous combination of properties consisting of high strengths of up to 1,400 MPa and extremely high elongations (uniform elongations up to 70% and elongations at break of 90%). Steels which are suitable for this intended use having high Mn contents of 6% wt. to 30% wt. are known, for example, from DE 102 59 230 A1, DE 197 27 759 C2 or DE 199 00 199 A1. Flat products produced from the known steels exhibit isotropic deformation behaviour at high strengths and, in addition, are also still ductile at low temperatures.

Set against these advantages, the disadvantage, however, is that high manganese-containing steels are prone to pitting and are only passivated with difficulty. This major proneness, compared to low-alloy steels, to locally admittedly limited, but intensive corrosion with the action of increased chloride ion concentrations, makes the use of steels belonging to the material group of high-alloy Mn steel sheets specifically in body construction difficult. In addition, high manganese-containing steels are prone to surface corrosion, which also limits the range of their applicability.

Due to the technological interest in these steels, in particular in the automotive industry, it is absolutely essential, therefore, to passivate the steel surface in the form of cathodic corrosion protection, for example by applying a metallic zinc or zinc-containing coating.

To counteract the problem of corrosion susceptibility, it was therefore proposed to coat steel flat products, produced from high manganese-containing steels, with a metallic protective layer which protects against corrosive attack, like a large number of other steel flat products provided for use in the area of car body construction.

Electrolytic zinc coating has proved suitable for this purpose. However, this way of applying a zinc coating is relatively involved from a procedural point of view. It should be added that there is the risk that the steel material will absorb amounts of hydrogen, by means of which its mechanical properties will be impaired.

In the commercial field, steel strips or sheets can be provided more cheaply and more simply from a procedural point of view by hot-dip coating with a metallic protective coating. With hot-dip coating, the flat product to be coated in each case is heated to a specific bath-entry temperature, at which it is then immersed in a melt bath. To adjust the layer thickness of the protective layer, the excess metal of the coating is subsequently wiped off the flat product. Hot-dip coating is, in practice, also called "hot-dip galvanizing" or "hot-dip aluminizing", depending on the basis of the coating material processed in each case.

Practical attempts to provide steel strips with high manganese contents with a metallic, protective coating by hot-dip coating have, however, resulted in fundamental problems when wetting the products to be coated with the coating melt. These led to the coating not adhering sufficiently to the steel substrate, with the result that cracks and flaking of the coating appeared, in particular when high manganese-containing sheets coated in such a way were cold deformed.

The possibilities, known from the group of high-alloy but lower Mn content steels, of improving the wettability by applying an intermediate layer of Fe or Ni did not meet with the success desired in the case of steel sheets having at least 6% wt. manganese.

In DE 10 2005 008 410 B3, it was proposed to apply an aluminium layer onto a steel strip containing 6-30% wt. Mn before the last annealing process preceding the hot-dip coating. The aluminium adhering to the steel strip prevents the surface of the steel strip from oxidising during the annealing of the steel strip preceding the melt film coating. Subsequently, the aluminium layer, like an adhesive agent, causes the coating produced by the melt film coating to also then adhere tightly and all-over to the steel strip, if the steel strip itself provides unfavourable conditions due to its alloying. To this end, in the known method the effect is utilised of iron diffusing from the steel strip into the aluminium layer during the annealing treatment which necessarily precedes the melt film coating. In the course of the annealing, a metallic layer, essentially consisting of Al and Fe, consequently forms on the steel strip, which metallic layer is firmly bonded to the substrate formed by the steel strip.

Another method for coating a high manganese-containing steel strip, containing 0.35-1.05% wt. C, 16-25% wt. Mn, the remainder being iron and unavoidable impurities, is known from WO 2006/042931 A1. According to this known method, the steel strip made in such a manner is firstly cold rolled and subsequently annealed in a re-crystallizing way in an atmosphere which behaves in a reducing way in relation to iron. The annealing parameters are thereby selected so that an intermediate layer, which essentially consists entirely of amorphous oxide (FeMn)O, appears on both sides of the steel strip and additionally an outer layer appears which consists of crystalline Mn oxide, wherein the thickness of the two layers is at least 0.5 μm. Practical tests have shown that even steel strips pre-coated in such an elaborate way do not have the adhesion to the steel substrate that is required for cold deformation.

In addition to the previously explained prior art, a method for hot-dip coating a hot-rolled steel plate which has a high tensile strength is known from JP 07-216524 A. In the course of this known process, the steel plate is firstly de-scaled, pickled and cleaned. Then it is weakly oxidised, in order to produce a thin iron oxide film on it which has a thickness of 500-10,000 Å. This iron oxide film is subsequently reduced to active metallic iron by reducing heating. The reducing heating is carried out such that a selective oxidation of Si and Mn in the steel and a concentration of these elements on the surface are avoided. For this purpose, the reducing heating is carried out under an atmosphere whose hydrogen concentration is regulated in the range from 3-25% vol., in such a way that it, on the one hand, has a reducing power which is sufficient to reduce the iron oxide and, on the other hand, however, a selective oxidation of Si and Mn does not happen.

Finally, from U.S. Pat. No. 5,677,005 a method is known for coating a cold rolled steel strip product containing 0.5-2.0% wt Mn with a metallic protective layer by hot dip galvanizing, in which the steel strip product, prior to entering the hot dip bath, undergoes a pickling process in order to remove the manganese oxide adhering to the steel strip product, wherein at higher Mn, Si or Cr contents it is proposed that the pickling is combined with a mechanical method for removing the oxide. The pickling bath can contain a sufficiently high concentration of hydrochloric or sulphuric acid in the conventional way, wherein as a typical example a hydrochloric acid concentration of 5% is mentioned. The dwell time in the pickling bath is typically between 5 and 60 seconds in the known method.

Additionally, from U.S. Pat. No. 5,810,950 it is known that for steels with higher Mn contents the oxide film adhering to them can be removed by pickling in a hydrochloric acid solution. However, this measure in this prior art is in no way linked to a subsequent hot dip galvanization to be carried out.

Despite the numerous proposals to be found in the prior art for improving the result of a hot-dip coating, it has been shown in practice that flat products can also therewith not be produced from high manganese-containing steels with the procedural simplicity and reliability of production required for a successful and commercial market-driven implementation and which are protected against corrosive attack with a quality corresponding to the requirements of secondary producers.

Against this background, the object of the invention was to specify a method with which, with increased productivity and reliability of production, flat products, consisting of steels having high manganese contents, can be reliably coated with a metallic protective layer which effectively protects against corrosive attack.

SUMMARY OF THE INVENTION

According to the invention, for hot-dip coating the steel flat product to be coated, containing 6-30% wt. manganese, is subjected to pickling treatment before entering the melt bath, in which pickling treatment the manganese oxide adhering to the steel strip is essentially fully removed in a pickling bath.

This teaching is based on the realisation that the bad adhesive qualities determined with the prior art originate in a strong and compact manganese oxide layer which appears during the annealing essential for hot-dip coating. The sheet surfaces, oxidised in the course of the annealing process, can no longer be wetted by the coating metal with the required uniformity and completeness.

The same applies if a hot-rolled strip, produced from a steel having a high manganese content of 6% wt. and more, is to be provided with the metallic protective coating by hot-dip coating without being cold rolled beforehand. An oxide layer is also present on this hot-rolled strip in the condition as delivered which in the prior art prevents reliably uniform and consistent wetting of the steel substrate.

As, according to the invention, the steel flat product in each case processed is so strongly pickled in the last production step carried out directly before entering the hot-dip coating installation, that manganese oxide present on the surface of the flat product is removed, it is guaranteed that the steel flat product to be coated enters the hot-dip coating stage with a surface composition which ensures that its surface is uniformly and completely wetted. The aim of the pickling carried out according to the invention is to remove as completely as possible, within the limits of what is technically feasible, manganese oxides, which are still present on the flat product processed in each case, before entering the pickle.

DETAILED DESCRIPTION OF THE PREFERRED EMBODIMENTS

After this removal of the manganese oxides carried out according to the invention, a conditioned steel surface is available for the hot-dip reaction, which can not only be particularly well wetted but also guarantees good coating adhesion which reliably withstands the stresses and strains which occur, for example, during cold deformation.

When the product to be coated is a cold-rolled steel strip or sheet, which has to undergo re-crystallizing annealing before the hot-dip coating, the pickling procedure according to the invention takes place between the exit from the respective annealing unit and entry into the hot-dip installation. The re-crystallising annealing is consequently decoupled from the hot-dip coating. Correspondingly, the re-crystallising annealing can be carried out under operating conditions which are optimised with regard to the annealing output and the efficiency of the annealing process. Complex control of the furnace atmosphere to prevent oxide formation can in this way be avoided.

The method according to the invention can be particularly efficiently carried out if the pickling treatment is completed in the pass. If such a pickling treatment, taking place in the pass, is combined with hot-dip coating, also taking place in the pass, the chronological sequence of the production steps can be easily synchronised with one another so that the risk of new formation of manganese oxide on the surface of the steel flat product, which is to be coated in each case, is reduced to a minimum when transferring from the pickling unit to the hot-dip coating installation. When the flat product to be processed is subjected to annealing before it is coated, it has, moreover, proved advantageous, with regard to the productivity of the entire process, if also the annealing unit standing in line with the pickling unit and the hot-dip coating installation are passed through in a continuous sequence.

For the pickling, according to the invention an aqueous solution is used which contains 20-200 g HCl/l. Optionally, the pickling bath can have an additional content of 10-200 g/l Fe. In addition to aqueous solutions of hydrochloric acid, an aqueous solution of sulphuric acid is also, for example, suitable as the pickling liquid for removing the manganese oxides. With acid concentrations which lie in the ranges mentioned, the as far as possible complete removal of the manganese oxides, aimed for according to the invention, occurs with a dwell time of the steel flat product in the pickling bath which is 5-60 seconds per unit of length of the steel strip. At the same time, particularly good pickling results are produced if the temperature of the pickling bath is 40-90° C.

The high productivity and efficiency of the method according to the invention is achieved according to the invention in that the steel flat product is exposed to at least two pickling baths in the course of the pickling treatment. In such a way, the first pickling bath passed through can to this end be used to dissolve coarse oxide accumulations from the surface of the steel substrate treated in each case, while in the second and following baths the then finer oxide residues still present in each case can be removed. In order to achieve this with a high effectiveness, the acid concentration of the second pickling bath can be set higher than the acid concentration of the first pickling bath. A further advantage of using two or more pickling baths with an increasing acid concentration from bath to bath, is that the consumed pickle of the pickling tank, passed through last in each case, can be used to pre-clean the steel strip at the beginning of the pickling treatment. In this way, the efficiency of the whole pickling treatment can be improved. With a plurality of pickling baths their acid concentrations and temperatures, as well as the dwell times, which the steel flat product spends in the respective bath per unit of length, in each case lie within the above mentioned generally specified limits.

One embodiment of the invention which is particularly important in practice is characterised in that the steel flat product is dried before entering the melt bath. In this way, the possibility of pickling liquid ending up in the hot-dip coating installation, and there negatively affecting the outcome of the hot-dip coating, is prevented.

If this is required, within the scope of the method according to the invention the flat product exiting from the pickle is also heated to a bath-entry temperature before entering the melt bath, which is necessary to get the most favourable outcome from the hot-dip coating. Heating can thereby be carried out in such a way that the bath-entry temperature, which is required in each case, is directly controlled. In order to guarantee that the steel flat product in each case processed is duly thoroughly heated, it can, however, also be advantageous to firstly heat the steel flat product to a peak heating temperature which is above the bath-entry temperature, to hold it there if necessary for a specific period of time and then to cool it to the bath-entry temperature required in each case.

In order to prevent oxide formation occurring again which impairs the coating result, in the course of heating the steel flat product before entering the melt bath for hot-dip coating, the surface temperature during heating should not exceed 700° C. The temperature range for the heating, preferred for practical application, is 350-700° C., in particular 450-700° C., wherein typically entry temperatures of 500-600° C. are chosen. The holding time, over which the steel flat product, for it to be thoroughly heated, is held per unit of length at the peak heating temperature which is above the bath-entry temperature, is typically in the range from 1-30 seconds.

The risk of oxide formation can, moreover, be counteracted by heating to the entry temperature being carried out under a protective atmosphere which protects the surface of the steel flat product from oxidation. A protective gas atmosphere suitable for this purpose consists of nitrogen and up to 30% vol., in particular 5-30% vol. hydrogen. In order to keep the oxidising potential of the atmosphere in the furnace used for the heating as low as possible, it is furthermore advantageous to keep the dew point of the protective gas atmosphere in the range from −80 to 0° C., in particular −50 to −15° C. during heating of the steel flat product to be coated.

The hot-dip coating following the pickling according to the invention, can for example be carried out as hot-dip galvanizing or as hot-dip aluminizing.

The method according to the invention is suitable for hot-dip coating of high manganese-containing steel strips with a layer essentially completely consisting of Zn and unavoidable impurities (the so-called "Z coating"). This layer can additionally contain (in % wt.) 0.3-0.8% Al and up to 0.7% Fe.

Furthermore, it is possible with the method according to the invention to hot-dip coat a steel substrate, containing at least 6% Mn, with a zinc-iron layer which (in % wt.) consists of up to 92% Zn and up to 12% Fe (the so-called "ZF coating"). Typically, the Fe content of such a coating lies in the range from 8-12% wt., wherein additionally 0.1-0.3% wt. Al can be present.

It is also possible, in the way according to the invention, to provide a high manganese-containing steel flat product with a so-called "ZA coating" by hot-dip coating, which in addition to zinc and unavoidable impurities contains up to 5% wt. Al and can have up to 0.05% wt. cerium or lanthanum.

The method according to the invention is furthermore suitable for applying onto a steel flat product, having an Mn content of at least 6% wt., an aluminium-zinc layer by hot-dip coating, the Al content of which is up to 60% wt. and the Zn content of which is up to 50% wt. (the so-called "AZ coating"), wherein additionally up to 2% wt. Si can be present. A typical composition of such an AZ coating has an Al content of 55% wt., a Zn content of 43.4% wt. and an Si content of 1.6% wt.

Likewise, a high manganese-containing steel flat product can, in the way according to the invention, be hot-dip coated with an aluminium-silicon layer which has an Al content of up to 92% wt. and an Si content of up to 12% wt. (the so-called "AS coating"). Typically, such an AS coating in practice has, in addition to aluminium and unavoidable impurities, an Si content of 8-11% wt.

Finally, there is also the possibility, within the scope of the invention, to hot-dip coat a high manganese-containing steel substrate with a zinc-magnesium layer (the so-called "ZnMg coating") which has an Mg proportion of up to 5% wt., typically 0.25-2.5% wt. Mg, and in addition contains optionally up to 11% wt. Al, typically 0.2-3.0% wt. Al, up to 4% wt. Fe and up to 2% wt. Si, as well as in total up to 0.8% wt. of one or more elements from the group "Pb, Bi, Cd, B, Ti, Si, Cu, Ni, Co, Cr, Mn, Sn, rare earths" and Zn as the remainder, as well as unavoidable impurities.

In the event that a coating substantially based on Al, that is, for example, an AZ or AS coating, has been applied in the way according to the invention, it can be advantageous with regard to optimising the cathodic protective effect of the coating to apply a zinc layer onto the Al based layer lying directly on the respective steel substrate. This can take place, for example, by the zinc layer being applied by electrolytic coating, dipping again into a Zn bath or deposition from the gas phase (e.g. by a PVD process) onto the layer which was obtained by hot-dip aluminizing. (By "PVD", a coating process is understood in which the respective metals or chemical compounds are deposited on the surface of the core layer to be coated by supplying thermal energy or by particle bombardment in a high-vacuum. The coating material is to this end converted from a solid material into the vapour phase and subsequently condensed on the respective surface. Ion plating and cathodic evaporation (sputtering) are also counted among the PVD processes.)

A first example for the high-alloy steel materials of which steel flat products, which are to be provided with a coating protecting against corrosion in the way according to the invention, consist, is a steel which contains (in % wt.) C: ≦1.6%, Mn: 6-30%, Al: ≦10%, Ni: ≦10%, Cr: ≦10%, Si: ≦8%, Cu: ≦3%, Nb: ≦0.6%, Ti: ≦0.3%, V: ≦0.3%, P: ≦0.1%, B: ≦0.01%, N: ≦1.0%, the remainder being iron and unavoidable impurities.

The effects achieved by the invention have a particularly advantageous impact when coating steel strips which have manganese contents of at least 15% wt. One steel flat product to be ranked in this category has (in % wt.) C: ≦1.00%, Mn: 20.0-30.0%, Al: ≦0.5%, Si: ≦0.5%, B: ≦0.01%, Ni: ≦3.0%, Cr: ≦10.0%, Cu: ≦3.0%, N: <0.6%, Nb: <0.3%, Ti: <0.3%, V: <0.3%, P: <0.1%, the remainder being iron and unavoidable impurities.

When applying the method according to the invention, particularly good coating results are also produced with those steel flat products which contain (in % wt.) C: ≦1.00%, Mn: 7.00-30.00%, Al: 1.00-10.00%, Si: >2.50-8.00%, (wherein it applies that the sum of Al content and Si content is >3.50-12.00%), B: <0.01%, Ni: <8.00%, Cu: <3.00%, N: <0.60%, Nb: <0.30%, Ti: <0.30%, V: <0.30%, P: <0.01%, the remainder being iron and unavoidable impurities.

With the invention, a cost-effective way is provided to protect high manganese-containing steel strips against corrosion efficiently, such that they can be used for producing bodies for vehicle construction, especially in car manufacture, the practical use of which exposes them to particularly corrosive media.

The invention will subsequently be explained by means of exemplary embodiments. The single FIGURE shows an enlarged photograph of a sample of a steel sheet provided with a zinc coating in the way according to the invention after a ball impact test.

To prove the effectiveness of the invention, various tests were carried out.

For the tests explained subsequently, from a high manganese-containing steel which, in addition to iron and unavoidable impurities, contained (in % wt.) 0.6% C, 22.7% Mn, 0.18% Si, 0.2% V, 0.01% Al, 0.08% Cr, 0.02% P, 0.001% Ti and 0.001% Nb, a hot-rolled strip was produced in the conventional way which was subsequently cold rolled into a cold-rolled strip in a similarly conventional way.

The cold-rolled strip obtained in such a way was then annealed in a re-crystallising way under an annealing atmosphere consisting of 95% vol. nitrogen and 5% vol. hydrogen at a temperature of 830° C. at a strip speed of 100 m/min in the continuous pass. The dew point of the annealing atmosphere was thereby held at −30° C.

In practice, for example, two conventional pickling tanks, passed through in the continuous pass, each 30 m in length, can be used for the pickling treatments carried out subsequently in the series of tests which are explained in detail below. The respective dwell time/per unit of length of the steel strip can then be set dependent on the speed at which in each case the steel strip to be treated is conducted through the pickling tanks. Thus, for example, a strip speed of 90 m/min yields a dwell time of 20 seconds for each pickling tank per unit of length of the steel strip concerned.

In a first series of tests, the steel strip produced in the way described above and annealed in a re-crystallising way was subjected to a pickling treatment carried out in two stages, in which it was conducted through two pickling baths for in each case 20 seconds per unit of length consecutively. The first of the pickling baths contained hydrochloric acid in a concentration of 73 g HCl/l, while the hydrochloric acid concentration of the second bath was 120 g HCl/l.

On exiting the second pickling bath, the surface of the sample tested was free from the oxide layer adhering to it previously.

Immediately after leaving the pickling bath, the steel strip was washed with water, in order to remove acid adhering to it and end the pickling process. Subsequently, the surface of the steel was dried by blowing off the remaining liquid there.

To heat to the bath-entry temperature required, the dried steel strip in the next step was firstly, under a nitrogen-hydrogen protective atmosphere containing 10% vol. hydrogen at a dew point of −30° C., heated to a surface temperature of 600° C. and held for 7 seconds at this temperature. After subsequent cooling to a bath-entry temperature of 470° C., the steel strip was dipped into a molten zinc bath which in addition to zinc and unavoidable impurities contained 0.22% wt. Al.

Subsequently, a ball impact test was carried out on a sample of the steel strip galvanized in this way. The perfect adhesion of the coating, even in the most heavily deformed area of the calotte formed into the steel sheet can be clearly recognised in FIG. 1.

In five further tests of the first series of tests, starting out from the test conditions explained previously for the first series of tests, firstly the dwell times "Dwell time pickle 1" and "Dwell time pickle 2" were varied in the pickling baths, wherein the peak heating temperature during subsequent heating to the bath-entry temperature was in each case 550° C. The wettability of the steel sheet and the adhesion of the coating were subsequently evaluated. The result of this evaluation is summarized in Table 1. It is demonstrated that optimum adhesion can be guaranteed with a dwell time lasting at least 20 seconds per unit of length in each pickling bath and accompanied by increasingly more complete removal of the oxide layer.

Subsequently, also based on the above explained test conditions, in 27 further tests at constant dwell times of in each case 20 s/unit of length in the two pickling baths, the peak heating temperatures reached during heating to the bath-entry temperature and the holding times, over which the steel strip was held at these peak heating temperatures, were varied. In these tests too, the wetting behaviour of the steel strip and the adhesion of the coating produced on it were evaluated. The results of these tests are summarized in Table 2. It is evident from these that with peak heating temperatures lying in the range from 400° C. to 650° C., holding times of less than 50 seconds have a positive effect on the wettability and adhesive strength, while very low or very high peak heating temperatures and holding times of 50 seconds and more have a negative effect on the wettability and the adhesion.

For a second test, a steel strip cold-rolled and annealed in a re-crystallising way was produced in the same way as described for the first test. In the course of the second test, this steel strip was also freed from the manganese oxide layer by dipping into a hydrochloric acid bath. For this purpose, two pickling baths of differing concentrations were used sequentially. The first pickling bath again contained 73 g HCl/l, while the second pickling bath had 120 g HCl/l. The dwell time in each pickling bath was 20 seconds per unit of length of the steel strip.

Immediately after leaving the last pickling bath, the steel strip was washed with water, in order to remove acid adhering to it and end the pickling process. Subsequently, the surface of the steel was dried.

To heat to the bath-entry temperature required, the steel strip in the next step, in a nitrogen/hydrogen protective atmosphere containing 10% vol. hydrogen at a dew point of −30° C., was heated to a surface temperature of 700° C. and held for 7 seconds at this temperature.

After cooling to the bath-entry temperature of 670° C., the steel strip was then dipped into a molten aluminium bath which contained 90% wt. Al and 10% wt. Si.

As in the first series of tests, in five further tests of the second series of tests, starting out from the test conditions explained previously for the second series of tests, firstly the dwell times "Dwell time pickle 1" and "Dwell time pickle 2" were varied in the pickling baths, wherein here the peak heating temperature during subsequent heating to the bath-entry temperature was in each case 700° C. The wettability of the steel sheet and the adhesion of the coating were subsequently evaluated. The result of this evaluation is summarized in Table 3. It appears in this case too that optimum adhesion of the coating layer obtained through hot-dip aluminizing can be guaranteed with a dwell time lasting at least 20 seconds per unit of length in each pickling bath and accompanied by increasingly more complete removal of the oxide layer.

Subsequently, also as with the first series of tests based on the test conditions explained above for the second series of tests, in 18 further tests at constant dwell times of in each case 20 s/unit of length in the two pickling baths, the peak heating temperatures reached during heating to the bath-entry temperature and the holding times, over which the steel strip was held at these peak heating temperatures, were varied. In these tests too, the wetting behaviour of the steel strip and the adhesion of the coating produced on it were evaluated. The results of these tests are summarized in Table 2. It is evident from these that with peak heating temperatures lying in the range from 600° C. to 700° C., the holding time has no significant effect on the wettability and adhesive strength, while at significantly lower or significantly higher peak heating temperatures the wettability and the adhesion decrease. A peak heating temperature of 700° C. at a holding time of 7 seconds delivers the best result.

In a third series of tests, a hot-dip aluminized steel strip, corresponding to the general test of the second series of tests, was provided with a zinc coating applied electrolytically. For this purpose, the aluminium coating applied previously in the way according to the invention was firstly given an alkaline cleaning and pre-treated in 10 seconds in a 40° C. hot pickling bath which was formed by an aqueous HCl solution (80 g/l HCl). Subsequently, a 6 μm thick zinc layer was deposited onto the aluminium layer, pre-treated in this way, in an electrolysis cell by means of a zinc sulphate electrolyte.

TABLE 1

| Serial No. | Dwell time pickle 1 (s) | Dwell time pickle 2 (s) | Peak heating temperature [° C.] | Wetting (*) | Adhesion (**) |
|---|---|---|---|---|---|
| 1 | 10 | 10 | 550 | 2 | 2 |
| 2 | 20 | 20 | 550 | 1 | 1 |
| 3 | 30 | 30 | 550 | 1 | 1 |
| 4 | 40 | 40 | 550 | 1 | 1 |
| 5 | 50 | 50 | 550 | 1 | 1 |

(*) Wetting evaluation:
1 = no unwetted areas;
2 = single unwetted areas;
3 = numerous unwetted areas.
(*) Adhesion according to September 1931:
1 = no cracks;
2 = fine cracks;
3 = cracks, fine chipping;
4 = intense chipping.

TABLE 2

| Serial No. | Peak heating temperature [° C.] | Holding time [s] | Dwell time pickle 1 (s) | Dwell time pickle 2 (s) | Wetting (*) | Adhesion (**) |
|---|---|---|---|---|---|---|
| 1 | 400 | 7 | 20 | 20 | 2 | 1 |
| 2 | 400 | 30 | 20 | 20 | 2 | 2 |
| 3 | 400 | 50 | 20 | 20 | 2 | 2 |
| 4 | 450 | 7 | 20 | 20 | 2 | 2 |
| 5 | 450 | 30 | 20 | 20 | 2 | 2 |
| 6 | 450 | 50 | 20 | 20 | 2 | 2 |
| 7 | 500 | 7 | 20 | 20 | 1 | 1 |
| 8 | 500 | 30 | 20 | 20 | 1 | 1 |
| 9 | 500 | 50 | 20 | 20 | 2 | 2 |
| 10 | 550 | 7 | 20 | 20 | 1 | 1 |
| 11 | 550 | 30 | 20 | 20 | 1 | 1 |
| 12 | 550 | 50 | 20 | 20 | 2 | 2 |
| 13 | 600 | 7 | 20 | 20 | 1 | 1 |
| 14 | 600 | 30 | 20 | 20 | 1 | 1 |
| 15 | 600 | 50 | 20 | 20 | 2 | 2 |
| 16 | 650 | 7 | 20 | 20 | 1 | 1 |
| 17 | 650 | 30 | 20 | 20 | 2 | 2 |
| 18 | 650 | 50 | 20 | 20 | 3 | 3 |
| 19 | 700 | 7 | 20 | 20 | 2 | 3 |
| 20 | 700 | 30 | 20 | 20 | 3 | 3 |
| 21 | 700 | 50 | 20 | 20 | 3 | 4 |
| 22 | 750 | 7 | 20 | 20 | 3 | 4 |
| 23 | 750 | 30 | 20 | 20 | 3 | 4 |
| 24 | 750 | 50 | 20 | 20 | 3 | 4 |
| 25 | 800 | 7 | 20 | 20 | 3 | 4 |
| 26 | 800 | 30 | 20 | 20 | 3 | 4 |
| 27 | 800 | 50 | 20 | 20 | 3 | 4 |

(*) Wetting evaluation:
1 = no unwetted areas;
2 = single unwetted areas;
3 = numerous unwetted areas.
(*) Adhesion according to September 1931:
1 = no cracks;
2 = fine cracks;
3 = cracks, fine chipping;
4 = intense chipping.

TABLE 3

| Serial No. | Dwell time pickle 1 (s) | Dwell time pickle 2 (s) | Peak heating temperature [° C.] | Wetting (*) | Adhesion (**) |
|---|---|---|---|---|---|
| 1 | 10 | 10 | 700 | 2 | 2 |
| 2 | 20 | 20 | 700 | 1 | 1 |
| 3 | 30 | 30 | 700 | 1 | 1 |
| 4 | 40 | 40 | 700 | 1 | 1 |
| 5 | 50 | 50 | 700 | 1 | 1 |

(*) Wetting evaluation:
1 = no unwetted areas;
2 = single unwetted areas;
3 = numerous unwetted areas.
(*) Adhesion according to September 1931:
1 = no cracks;
2 = fine cracks;
3 = cracks, fine chipping;
4 = intense chipping.

TABLE 4

| Serial No. | Peak heating temperature [° C.] | Holding time [s] | Dwell time pickle 1 (s) | Dwell time pickle 2 (s) | Wetting (*) | Adhesion (**) |
|---|---|---|---|---|---|---|
| 1 | 550 | 7 | 20 | 20 | 3 | 4 |
| 2 | 550 | 30 | 20 | 20 | 3 | 4 |
| 3 | 550 | 50 | 20 | 20 | 3 | 4 |
| 4 | 600 | 7 | 20 | 20 | 2 | 2 |
| 5 | 600 | 30 | 20 | 20 | 2 | 2 |
| 6 | 600 | 50 | 20 | 20 | 2 | 2 |
| 7 | 660 | 7 | 20 | 20 | 2 | 2 |
| 8 | 650 | 30 | 20 | 20 | 2 | 2 |
| 9 | 650 | 50 | 20 | 20 | 2 | 2 |
| 10 | 700 | 7 | 20 | 20 | 1 | 1 |
| 11 | 700 | 30 | 20 | 20 | 2 | 2 |
| 12 | 700 | 50 | 20 | 20 | 2 | 2 |
| 13 | 750 | 7 | 20 | 20 | 3 | 2 |
| 14 | 750 | 30 | 20 | 20 | 3 | 3 |
| 15 | 750 | 50 | 20 | 20 | 3 | 4 |
| 16 | 800 | 7 | 20 | 20 | 3 | 4 |
| 17 | 800 | 30 | 20 | 20 | 3 | 4 |
| 18 | 800 | 50 | 20 | 20 | 3 | 4 |

(*) Wetting evaluation:
1 = no unwetted areas;
2 = single unwetted areas;
3 = numerous unwetted areas.
(*) Adhesion according to September 1931:
1 = no cracks;
2 = fine cracks;
3 = cracks, fine chipping;
4 = intense chipping.

The invention claimed is:

1. A method for coating a hot-rolled or cold-rolled steel flat product, containing 6-30% wt. Mn, with a metallic protective layer by hot-dip coating in a melt bath, wherein the steel flat product is subjected to a pickling treatment before entering the melt bath, in which the steel flat product is exposed to at least two pickling baths, wherein the pickling baths each comprise 20-200 g/l of hydrochloric acid or sulphuric acid and optionally 10-200 g/l Fe and an acid concentration of the second pickling bath is higher than an acid concentration of the first pickling bath, so that manganese oxide adhering to the steel flat product is removed.

2. The method according to claim 1, wherein the pickling treatment is completed in a continuous pass.

3. The method according to claim 2, wherein a dwell time of the steel flat product in at least one of the pickling baths is 5-60 seconds per unit of length.

4. The method according to claim 1, wherein the temperature of at least one of the pickling baths is 40-90° C.

5. The method according to claim 1, wherein the steel flat product is dried before entering the melt bath.

6. The method according to claim 1, wherein the steel flat product is heated to a bath-entry temperature before entering the melt bath.

7. The method according to claim 6, wherein the steel flat product when heating to the bath-entry temperature is first heated to a peak heating temperature which is above the bath-entry temperature and is subsequently cooled from the peak heating temperature to the bath-entry temperature.

8. The method according to claim 7, wherein a surface temperature of the steel flat product during heating does not exceed 700° C.

9. The method according to claim 6, wherein heating to the bath-entry temperature takes place under a protective atmosphere protecting a surface of the steel flat product from oxidation.

10. The method according to claim 9, wherein the protective atmosphere is formed of nitrogen and 5-30% vol. hydrogen.

11. The method according to claim 10, wherein a dew point of the protective atmosphere is −50° C. to −15° C.

12. The method according to claim 1, wherein the steel flat product is cold-rolled and subjected to re-crystallizing annealing before the pickling treatment.

13. The method according to claim 1, wherein the hot-dip coating is carried out as hot-dip galvanizing.

14. The method according to claim 1, wherein the hot-dip coating is carried out as hot-dip aluminizing.

15. The method according to claim 14, wherein a zinc layer is applied onto the protective layer obtained after hot-dip aluminizing.

16. The method according to claim 1, wherein the hot-dip coating is completed in a continuous pass.

17. The method according to claim 1, wherein the steel flat product comprises (in % wt.) C: $\leq$1.6%, Mn: 6-30%, Al: $\leq$10%, Ni: $\leq$10%, Cr: $\leq$10%, Si: $\leq$8%, Cu: $\leq$3%, Nb: $\leq$0.6%, Ti: $\leq$0.3%, P: $\leq$0.1%, B: $\leq$0.01%, N: $\leq$1.0%, the remainder being iron and unavoidable impurities.

18. The method according to claim 17, wherein the steel flat product comprises (in % wt.) C: $\leq$1.00%, Mn: 20.0-30.0%, Al: $\leq$0.5%, Si: $\leq$0.5%, B: $\leq$0.01%, Ni: $\leq$3.0%, Cr: $\leq$10.0%, Cu: $\leq$3.0%, N: $\leq$0.6%, Nb: $\leq$0.3%, Ti: $\leq$0.3%, V: <0.3%, P: <0.1%, the remainder being iron and unavoidable impurities.

19. The method according to claim 1, wherein the steel flat product comprises (in % wt.) C: $\leq$1.00%, Mn: 7.00-30.00%, B: <0.01%, Ni: <8.00%, Cu: <3.00%, N: <0.60%, Nb: <0.30%, Ti: <0.30%, V: <0.30%, P: <0.01%, Al: 1.00-10.00%, Si: >2.50-8.00%, the remainder being iron and unavoidable impurities, wherein Al content+Si content>3.50-12.00%.

* * * * *

UNITED STATES PATENT AND TRADEMARK OFFICE
CERTIFICATE OF CORRECTION

PATENT NO.           : 8,506,731 B2
APPLICATION NO.      : 12/864102
DATED                : August 13, 2013
INVENTOR(S)          : Manfred Meurer et al.

It is certified that error appears in the above-identified patent and that said Letters Patent is hereby corrected as shown below:

In the Claims

Column 12, Line 15, Claim 17, after "Ti: $\leq 0.3\%$," insert -- V: $\leq 0.3\%$, --

Column 12, Line 20, Claim 18, delete "N: $\leq 0.6\%$, Nb: $\leq 0.3\%$, Ti: $\leq 0.3\%$," and insert
-- N: <0.6%, Nb: <0.3%, Ti: <0.3%, --

Signed and Sealed this
Twenty-fourth Day of December, 2013

Margaret A. Focarino
*Commissioner for Patents of the United States Patent and Trademark Office*

UNITED STATES PATENT AND TRADEMARK OFFICE
CERTIFICATE OF CORRECTION

PATENT NO.        : 8,506,731 B2              Page 1 of 1
APPLICATION NO.   : 12/864102
DATED             : August 13, 2013
INVENTOR(S)       : Meurer et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 609 days.

Signed and Sealed this
Fifteenth Day of September, 2015

Michelle K. Lee
*Director of the United States Patent and Trademark Office*